No. 699,631. Patented May 6, 1902.
E. J. PENNINGTON.
RUNNING GEAR FOR VEHICLES.
(Application filed June 10, 1901.)
(No Model.)

UNITED STATES PATENT OFFICE.

EDWARD J. PENNINGTON, OF LONDON, ENGLAND.

RUNNING-GEAR FOR VEHICLES.

SPECIFICATION forming part of Letters Patent No. 699,631, dated May 6, 1902.

Application filed June 10, 1901. Serial No. 64,035. (No model.)

*To all whom it may concern:*

Be it known that I, EDWARD J. PENNINGTON, a citizen of the United States, residing at the Hotel Metropole, London, England, have invented new and useful Improvements in Running-Gear for Vehicles, of which the following is a specification.

My invention relates to a flexible connection between a moving portion of the running-gear of an automobile which is shifted in position in steering and some part of the opposite end of the carriage, preferably a stationary back axle, whereby the running-gear is braced and strain removed from it and the vehicle-body.

By the use of my invention I am enabled to simplify the construction and reduce cost, weight, and strength, and in general no alteration is made in existing running-gear, my device being used as an additional brace to relieve or distribute strains and being especially valuable for use with heavily-laden motor-driven vehicles, such as omnibuses, delivery-vans, &c.

Figure 1:
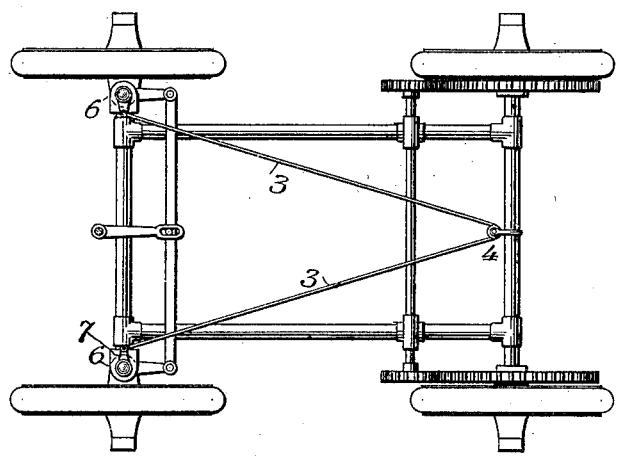
Figure 2:
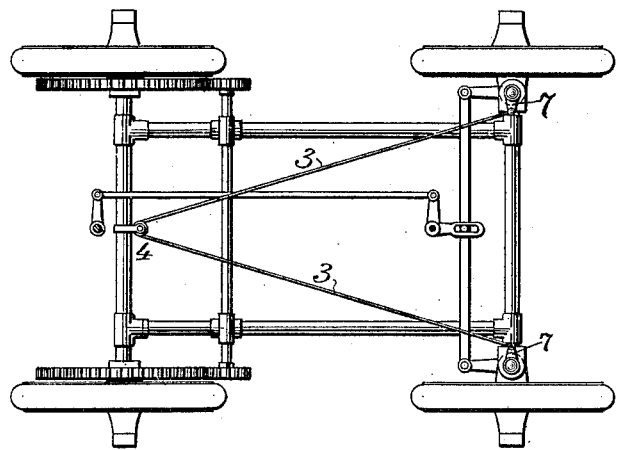

In the accompanying drawings, Figure 1 is a plan view of an automobile to which my invention is applied, the front wheels being used for steering. Fig. 2 is a similar view of an automobile, also showing the invention applied, but the rear wheels used for steering.

Similar numerals of reference indicate similar parts in the respective figures.

When my invention is attached to a front-steered automobile, as seen in Fig. 1, the ends of a wire or other rope 3 are made fast to the arms 7 7 on the steering-knuckles 6 of the front wheels instead of to the front axle, which remains stationary, the rope 3 turning over a pulley in the block 4, secured to the rear axle or other fixed part, or in case the front wheels run in a fork each end of the rope is suitably secured to the inner side of a fork or to a bracket fixed to and projecting therefrom.

In Fig. 2, showing an automobile having rear steering-wheels, the arrangement is the reverse of that seen in Fig. 1, the rope 3 turning over the pulley in the block 4, fixed to the front axle or other immovable part.

As in many automobiles the rear axle is driven by the motor mechanism, the pulley at the rear is fixed to the running-gear or to the carriage-body.

My invention is applicable to any type of vehicle in which swiveled steering-wheels are employed and is intended to cover, broadly, a flexible and self-adjusting connection between such axle and steering-wheels and a fixed part of the vehicle.

Having thus described my invention, I claim—

In a vehicle, the combination of a fixed wheeled axle at one end thereof; an axle at the opposite end of the vehicle carrying steering knuckles and wheels adapted to be shifted in position in steering; a block or support attached centrally to the fixed axle; a pulley mounted in said block or support, and a flexible connection having one end secured to an arm on the steering-knuckle of the running-gear adapted to be shifted in position in steering, then passing around said pulley and having its opposite end fastened to the other and coincidently-operated steering-knuckle of said running-gear, substantially as set forth.

In testimony whereof I affix my signature in presence of two witnesses.

EDWARD J. PENNINGTON.

Witnesses:
GEORGE H. HOWARD,
ROBERT H. PATTERSON.